(12) United States Patent
Kanai et al.

(10) Patent No.: US 7,891,006 B2
(45) Date of Patent: *Feb. 15, 2011

(54) ELECTRONIC INFORMATION EMBEDDING METHOD AND EXTRACTING METHOD, ELECTRONIC INFORMATION BURYING APPARATUS AND EXTRACTING APPARATUS, AND PROGRAMS THEREFOR

(75) Inventors: Satoshi Kanai, Hokkaido (JP); Tatsuhide Nakane, Tokyo (JP); Naoko Kurisaki, Tokyo (JP); Ikuhiro Kitamura, Tokyo (JP)

(73) Assignee: Kokusai Kogyo Co., Ltd., Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 12/050,690

(22) Filed: Mar. 18, 2008

(65) Prior Publication Data

US 2009/0003602 A1     Jan. 1, 2009

Related U.S. Application Data

(63) Continuation of application No. 10/476,694, filed as application No. PCT/JP01/10904 on Dec. 12, 2001, now Pat. No. 7,370,363.

(51) Int. Cl.
*G06F 7/04* (2006.01)
(52) U.S. Cl. .................................................. 726/26
(58) Field of Classification Search ........................ None
See application file for complete search history.

(56) References Cited

U.S. PATENT DOCUMENTS 6,359,998 B1   3/2002   Cooklev 6,529,506 B1   3/2003   Yamamoto et al.

(Continued)

FOREIGN PATENT DOCUMENTS

JP          10-320583          4/1998

(Continued)

OTHER PUBLICATIONS

V. Solachidis, N. Nikolaidis and I. Pitas Fourier Descriptors Watermarking of Vector Graphics Images, 2000, IEEE, pp. 9-12.

(Continued)

*Primary Examiner*—David J Pearson
(74) *Attorney, Agent, or Firm*—Crowell & Moring LLP

(57) ABSTRACT

On embedding electronic watermark data in point group data obtained from a three-dimensional measurement, an x-y plane region defining the point group data is divided into a plurality of small regions so that a point group is produced with respect to each of small regions. The coordinate values of each point group are offset with making a barycenter of the point group be an origin point. A discrete Fourier transform is carried out in order to produce a Fourier coefficient sequence, which is modified into a watermarked Fourier coefficient sequence. The inverse discrete Fourier transform is carried out on the watermarked coefficient sequence in order to produce a watermarked complex number sequence. An optimum watermark embedding strength is calculated. On the basis of the embedding strength, the Fourier coefficient sequence is modified to produce a watermarked Fourier coefficient sequence which is inversely offset into the watermarked point group data.

24 Claims, 5 Drawing Sheets

U.S. PATENT DOCUMENTS

| | | |
|---|---|---|
| 6,614,914 B1 | 9/2003 | Rhoads et al. |
| 6,665,419 B1 | 12/2003 | Oami |
| 6,950,519 B2 | 9/2005 | Rhoads |
| 6,983,058 B1 | 1/2006 | Fukuoka et al. |
| 7,164,778 B1* | 1/2007 | Nakamura et al. .......... 382/100 |
| 7,370,363 B2* | 5/2008 | Kanai et al. ................... 726/26 |
| 2002/0001394 A1* | 1/2002 | Taniguchi et al. ........... 382/100 |

FOREIGN PATENT DOCUMENTS

JP   2000-209428 A   7/2000

OTHER PUBLICATIONS

R. Ohbuchi et al., "Watermarking 3D Polygonal Meshes Using Mesh Spectral Analysis", Computer Science Dept., Yamanishi University & Computer Center, Gunma University, pp. 1-6, 2000.

H. Date et al., "Digital Watermarking for 3D Polygonal Model Based on Wavelet Transform" Proceedings of DETC ' 99, 1999 ASME Design Engineering Technical Conferences, Sep. 12-15, 1999, pp. 1-10.

G. Karypis et al., "A Fast and High Quality Multilevel Scheme for Partitioning Irregular Graphs", SIAM J. Sci. Comput., vol. 20, pp. 359-392, 1998 Society for Industrial and Applied Mathematics.

* cited by examiner

ELECTRONIC INFORMATION EMBEDDING METHOD AND EXTRACTING METHOD, ELECTRONIC INFORMATION BURYING APPARATUS AND EXTRACTING APPARATUS, AND PROGRAMS THEREFOR

CROSS REFERENCE TO RELATED APPLICATIONS

This is a continuation application from U.S. Ser. No. 10/476,694, filed Nov. 5, 2003. This application claims the priority of PCT application No. PCT/JP01/10904, filed Dec. 12, 2001, the disclosure of which are expressly incorporated by reference herein.

TECHNICAL FIELD

The present invention relates to a method and an apparatus for managing an original random point group data (three dimensional point group data) which are obtained on the basis of a three dimensional measurement, and more particularly, to a method and an apparatus for use in embedding electronic information as electronic watermark data in the three dimensional point group data in order to prevent an unauthorized use with respect to the three dimensional point group data which are obtained by measuring the surface of the earth on the basis of the three dimensional measurement using a laser.

BACKGROUND OF THE ART

In general, a pattern having a plurality of fine factors is embedded in a printed matter, in order to prevent falsification or unauthorized use. The unauthorized use is detected in accordance with information, which is produced by the pattern. Furthermore, information (embedding information) for preventing the unauthorized use is embedded in map data, in order to prevent the unauthorized use with respect to the map data described in vector form (vector type). In two or three dimensional map data described in the vector type, the embedding information is embedded in polygons, which form a plane. For example, a method is known in which the map data is composed of aggregation of triangle polygons each of which is divided into four triangles. The electronic watermark data are embedded as embedding data in a triangle formed between the triangle polygons (a triangle which does not include vertexes of each triangle polygon). By using the above-mentioned method, it is difficult to remove the electronic watermark data without affecting the map data described in the vector type.

On the other hand, disclosure is made in Japanese Patent Publication 2001-160897 A about embedding the embedding information for the unauthorized use prevention in the map data described in the vector type. In the publication, information having an embedding standard layer and an embedding reference layer is inputted to map pictorial information representative of a coordinate sequence of layout points in each object. The information having the embedding standard layer and the embedding reference layer is inputted to layer information which is for use in managing a type of each object. An embedding reference object pair is selected which exists in a region having the same meaning and whose region does not have other objects. An object is selected in which it is difficult to find out its embedded location, with respect to the embedding reference object. Renewal embedding object information is produced in accordance with an existence location and/or a shape characteristic of the selected object and a renewal object is embedded on the basis of an embedding density in synchronism with the object information.

Recently, the surface of earth (ground level) is measured by using so-called laser three-dimensional measurement in order to obtain data of ground level as an original random point group data and to obtain map data in accordance with the original random point group data. More particularly, an aircraft irradiates a laser pulse beam towards the ground in order to obtain spatial coordinates of the ground level. In this event, the spatial position of the aircraft is calculated by using a GPS reference station positioned on the ground and a GPS receiver installed on the aircraft. The attitude of the aircraft is calculated by using a three-axis gyroscope.

Incidentally, the ground coordinates of each one pulse is produced as x, y, and z coordinates of laser beam reflected point by the irradiating angle of the laser mirror and the slant distance of the laser mirror, in accordance with the spatial position and the attitude of the aircraft that are obtained in the manner described above.

Inasmuch as the ground coordinates obtained in the manner described above is merely representative of the random point group data of the ground level, it is necessary to process the random point group data into the map data.

Inasmuch as the original point group data described above are point group data, which are merely dispersed spatially, the original point group data, does not have relationships among one another and does not have attributes, respectively. In other wards, the original point group data are merely representative of x, y, and z coordinates. Accordingly, it is impossible to use the method of embedding the electronic watermark data into the above-mentioned vector type map data, with respect to the original point group data. As a result, it is easy to produce the map data by the unauthorized use of the original random point group data.

In addition, it is difficult to reproduce the original random point group data in case of embedding the electronic watermark data into the original random point group data in accordance with random numbers, within a predetermined accuracy. Furthermore, it is difficult to prevent the unauthorized use in case of partially thinning out the original random point group data, in order to embed the electronic watermark data into the original random point group data.

DISCLOSURE OF THE INVENTION

It is an object of the present invention to provide an electronic information embedding method, an electronic information embedding apparatus, and a program each of which is capable of preventing unauthorized use of original random point group data.

It is another object of the present invention to provide an electronic information extracting method, an electronic information extracting apparatus, and a program each of which is for use in extracting the electronic information from the original random point group data into which the electronic information is embedded.

According to the present invention, there is provided an electronic information embedding method for use in embedding electronic information as electronic watermark data in original random point group data which are obtained on the basis of a three dimensional laser measurement. The electronic information embedding method is characterized by comprising a first step of carrying out a discrete Fourier transform with respect to the original random point group data to produce a Fourier coefficient sequence, a second step of modifying the Fourier coefficient sequence in accordance with the electronic watermark data to produce a watermarked Fourier coefficient sequence, and a third step of carrying out an inverse discrete Fourier transform with respect to the watermarked Fourier coefficient sequence to produce a watermarked point group data on the basis of the inverse discrete Fourier transform.

In this case, the first step comprises a fourth step of producing a point group with respect to each of small regions into which an x-y plane region defining said original random point group data is divided in a predetermined number, a fifth step of offsetting x and y coordinate values of each point group with making a barycenter of the point group be an origin point, to convert each point group into an offset point group, and a sixth step of carrying out the discrete Fourier transform with respect to each of the offset point group to produce the Fourier coefficient sequence.

In addition, the third step comprises a seventh step of carrying out the inverse discrete Fourier transform with respect to the watermarked Fourier coefficient sequence to produce a watermarked complex sequence, an eighth step of producing an optimum watermark embedding strength which satisfies a tolerance of coordinate error based on watermarking, with respect to the watermarked complex sequence, a ninth step of again modifying the Fourier coefficient sequence in accordance with the optimum watermark embedding strength to produce a watermarked Fourier coefficient sequence, and a tenth step of inversely offsetting the watermarked Fourier coefficient sequence to produce the watermarked point group data.

Furthermore, there is provided an electronic information extracting method of extracting the electronic watermark data from the watermarked point group data which is obtained in the method described above, according to the present invention. The electronic information extracting method is characterized by comprising an eleventh step of carrying out a discrete Fourier transform with respect to the original random point group data and the watermarked point group data with bringing the original random point group data into correspondence with the watermarked point group data, to produce first and second Fourier coefficient sequences and a twelfth step of comparing said first Fourier coefficient sequence with the second Fourier coefficient sequence to extract the electronic watermark data from the first and second Fourier coefficient sequences.

In this case, the eleventh step comprises a thirteenth step of producing a small region point group with respect to each of small regions into which an x-y plane region defining the original random point group data is divided in a predetermined number and a fourteenth step of making a search for a shortest distance vertex which has a shortest distance between a vertex of the small region point group with respect to each of the small region point groups, from the watermarked point group data, to bring the original random point group data into correspondence with the watermarked point group data.

For example, the fourteenth step comprises a fifteenth step of producing a 2-d tree with respect to the watermarked point group data and a sixteenth step of setting an inquiry region which is defined by vertex position of each small region point group and an embedding tolerance, to make a search for the watermarked point group data included in the inquiry region, from the 2-d tree and to bring the original random point group data into correspondence with the watermarked point group data.

In addition, there is provided an electronic information embedding apparatus for use in embedding electronic information as electronic watermark data in original random point group data which are obtained on the basis of a three dimensional laser measurement, according to the present invention.

The electronic information embedding apparatus is characterized by comprising discrete Fourier transform means for carrying out a discrete Fourier transform with respect to the original random point group data to produce a Fourier coefficient sequence, modifying means for modifying the Fourier coefficient sequence in accordance with the electronic watermark data to produce a watermarked Fourier coefficient sequence and watermarked point group data producing means for carrying out an inverse discrete Fourier transform with respect to the watermarked Fourier coefficient sequence to produce a watermarked point group data on the basis of said inverse discrete Fourier transform.

In this case, the discrete Fourier transform means comprises dividing means for producing a point group with respect to each of small regions into which an x-y plane region defining the original random point group data is divided in a predetermined number, offset means for offsetting x and y coordinate values of each point group with making a barycenter of the point group be an origin point, to convert each point group into an offset point group, and Fourier coefficient producing means for carrying out the discrete Fourier transform with respect to each of the offset point group to produce the Fourier coefficient sequence.

Furthermore, the watermarked point group data producing means comprises complex sequence producing means for carrying out the inverse discrete Fourier transform with respect to the watermarked Fourier coefficient sequence to produce a watermarked complex sequence, watermark embedding strength producing means for producing an optimum watermark embedding strength which satisfies a tolerance of coordinate error based on watermarking, with respect to the watermarked complex sequence, additional modifying means for again modifying the Fourier coefficient sequence in accordance with the optimum watermark embedding strength to produce a watermarked Fourier coefficient sequence, and inverse offset means for inversely offsetting the watermarked Fourier coefficient sequence to produce the watermarked point group data.

Furthermore, there is provided an electronic information extracting apparatus for extracting the electronic watermark data from the watermarked point group data, which are obtained, by the electronic information embedding apparatus described above, according to the present invention. The electronic information extracting apparatus is characterized by comprising Fourier coefficient producing means for carrying out a discrete Fourier transform with respect to the original random point group data and the watermarked point group data with bringing the original random point group data into correspondence with the watermarked point group data, to produce first and second Fourier coefficient sequences and extracting means for comparing the first Fourier coefficient sequence with the second Fourier coefficient sequence to extract the electronic watermark data from the first and second Fourier coefficient sequences.

In this case, the Fourier coefficient producing means comprises dividing means for producing a small region point group with respect to each of small regions into which an x-y plane region defining the original random point group data are divided in a predetermined number and correspondence means for making a search for a shortest distance vertex which has a shortest distance between a vertex of the small region point group with respect to each of the small region point groups, from the watermarked point group data, to bring the original random point group data into correspondence with the watermarked point group data.

For example, the correspondence means comprises 2-d tree producing means for producing a 2-d tree with respect to the watermarked point group data and vertex correspondence means for setting an inquiry region which is defined by vertex position of each small region point group and an embedding tolerance, to make a search for the watermarked point group data included in the inquiry region, from the 2-d tree and to bring the original random point group data into correspondence with the watermarked point group data.

In addition, there is provided an electronic information embedding program used in a computer on embedding electronic information as electronic watermark data in original random point group data which are obtained on the basis of a three dimensional measurement, according to the present invention. The electronic information embedding program is characterized by comprising a first procedure of carrying out a discrete Fourier transform with respect to the original random point group data to produce a Fourier coefficient sequence, a second procedure of modifying the Fourier coefficient sequence in accordance with the electronic watermark data to produce a watermarked Fourier coefficient sequence, and a third procedure of carrying out an inverse discrete Fourier transform with respect to the watermarked Fourier coefficient sequence to produce a watermarked point group data on the basis of the inverse discrete Fourier transform.

In this case, the first procedure comprises a fourth procedure of producing a point group with respect to each of small regions into which an x-y plane region defining the original random point group data is divided in a predetermined number, a fifth procedure of offsetting x and y coordinate values of each point group with making a barycenter of the point group be an origin point, to convert each point group into an offset point group, and a sixth procedure of carrying out the discrete Fourier transform with respect to each of the offset point group to produce the Fourier coefficient sequence.

In addition, the third procedure comprises a seventh procedure of carrying out the inverse discrete Fourier transform with respect to the watermarked Fourier coefficient sequence to produce a watermarked complex number sequence, an eighth procedure of producing an optimum watermark embedding strength which satisfies a tolerance of coordinate error based on watermarking, with respect to the watermarked complex sequence, a ninth procedure of again modifying the Fourier coefficient sequence in accordance with the optimum watermark embedding strength to produce a watermarked Fourier coefficient sequence, and a tenth procedure of inversely offsetting the watermarked Fourier coefficient sequence to produce the watermarked point group data.

Furthermore, there is provided an electronic information extracting program of extracting the electronic watermark data from the watermarked point group data which is obtained in the manner described above, according to the present invention. The electronic information extracting program is characterized by comprising an eleventh procedure of carrying out a discrete Fourier transform with respect to the original random point group data and the watermarked point group data with bringing the original random point group data into correspondence with the watermarked point group data, to produce first and second Fourier coefficient sequences and a twelfth procedure of comparing the first Fourier coefficient sequence with the second Fourier coefficient sequence to extract the electronic watermark data from the first and second Fourier coefficient sequences.

In this case, the eleventh procedure comprises a thirteenth procedure of producing a small region point group with respect to each of small regions into which an x-y plane region defining the original random point group data is divided in a predetermined number and a fourteenth procedure of making a search for a shortest distance vertex which has a shortest distance between a vertex of the small region point group with respect to each of the small region point groups, from the watermarked point group data, to bring the original random point group data into correspondence with the watermarked point group data.

For example, the fourteenth procedure comprises a fifteenth procedure of producing a 2-d tree with respect to the watermarked point group data and a sixteenth procedure of setting an inquiry region which is defined by vertex position of each small region point group and an embedding tolerance, to make a search for the watermarked point group data included in the inquiry region, from the 2-d tree and to bring the original random point group data into correspondence with the watermarked point group data.

BEST MODE FOR EMBODYING THE PRESENT INVENTION

Description will be made as regards the present invention with reference to figures.

Figure 1:
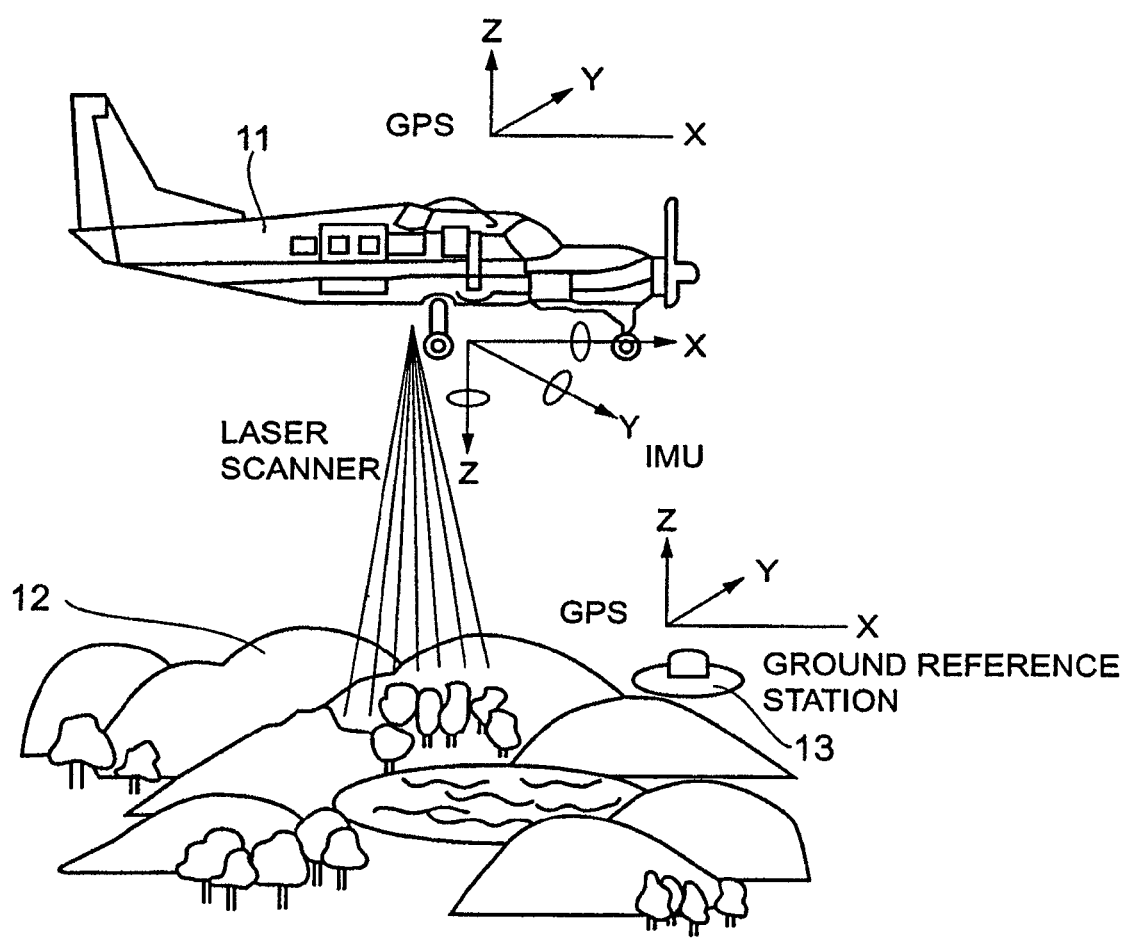
FIG. 1 shows a view for describing measurement of ground level based on a three-dimensional laser measurement.

Referring to FIG. 1, a three-dimensional measurement is carried out with respect to earth surface (for example, ground level) at first, on obtaining original random point group data concerned to earth surface. In case where the three-dimensional measurement is carried out with respect to earth surface, a three-dimensional laser measurement may be used. On carrying out the three-dimensional laser measurement, an aircraft 11 flies over an area (zone) at which original random point group data should be collected. The aircraft 11 has a laser scanner (aircraft installed laser scanner: not shown), a GPS receiver (not shown), and a gyroscope (IMU: not shown).

Figure 2:
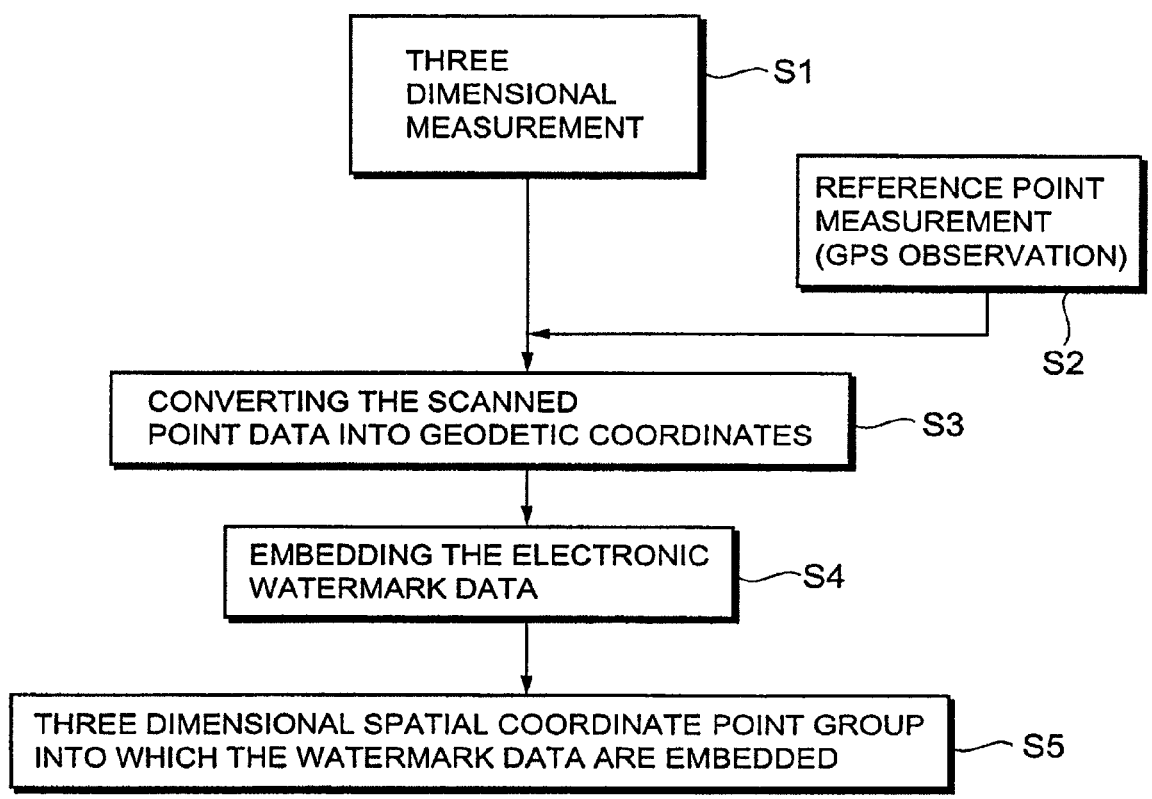
FIG. 2 is a flow chart for describing a manner for use in obtaining watermarked point group from data obtained by the three-dimensional laser measurement.

Referring to FIG. 2 together with FIG. 1, a pulse laser beam is irradiated from the aircraft installed laser scanner towards the ground (ground level) 12, in the three-dimensional laser measurement (step S1). The aircraft 11 receives a reflected pulse from the ground level 12, as a pulse return. The aircraft installed laser scanner measures a distance (z) between the aircraft and the ground level 12 in accordance with a time difference between a time instant of pulse laser beam irradiation and a time instant of pulse return reception, in order to obtain distance data. Inasmuch as the pulse laser beam is irradiated at a predetermined time interval, the ground level is defined as discrete points. In this event, a scanning mirror rotates at one axis (which is perpendicular to the flight direction of the aircraft 11), in the laser scanner. The flight direction is another scanning axis so that data is obtained with respect to the ground level. The IMU calculates a laser irradiating angle at each one pulse on the basis of a mirror rotation angle and a mirror inclination angle.

Furthermore, data is obtained with respect to the ground level on the ground, using a laser scanner (ground installed laser scanner). In the ground installed laser scanner, the scanning mirror has two rotating axis so that it is possible to radically obtain the data with respect to the ground level.

On the other hand, a reference point measurement is carried out in accordance with a GPS radio wave (step S2). In other wards, the spatial position of the aircraft 11 is measured by using the GPS receiver, the IMU, and a GPS reference station 13 installed on the ground. After that, scanning point data are converted into geodetic coordinate data on the basis of data (scanning point data) obtained by the three-dimensional laser measurement and data obtained by the reference point measurement, in order to obtain the original random point group data (step S3). In other words, x, y, and z (height H) coordinates are produced which represent laser beam reflected point of the ground level 12, at each one pulse, in order to obtain the original random point group data.

Electronic watermark data are embedded into the above-mentioned original random point group data (step S4) that are outputted as watermark information (data) embedded three-dimensional spatial coordinate point group (step S5). Incidentally, a computer (not shown) carries out the steps S3 to S5. In other words, the computer comprises at least a geodetic coordinate converting section for carrying out the step S3, an electronic watermark embedding section for carrying out the step S4, and a watermark point group outputting section for carrying out the step S5. The geodetic coordinate converting section reads the scanning point data and the reference point measurement data to produce the original random point group data.

Figure 3:
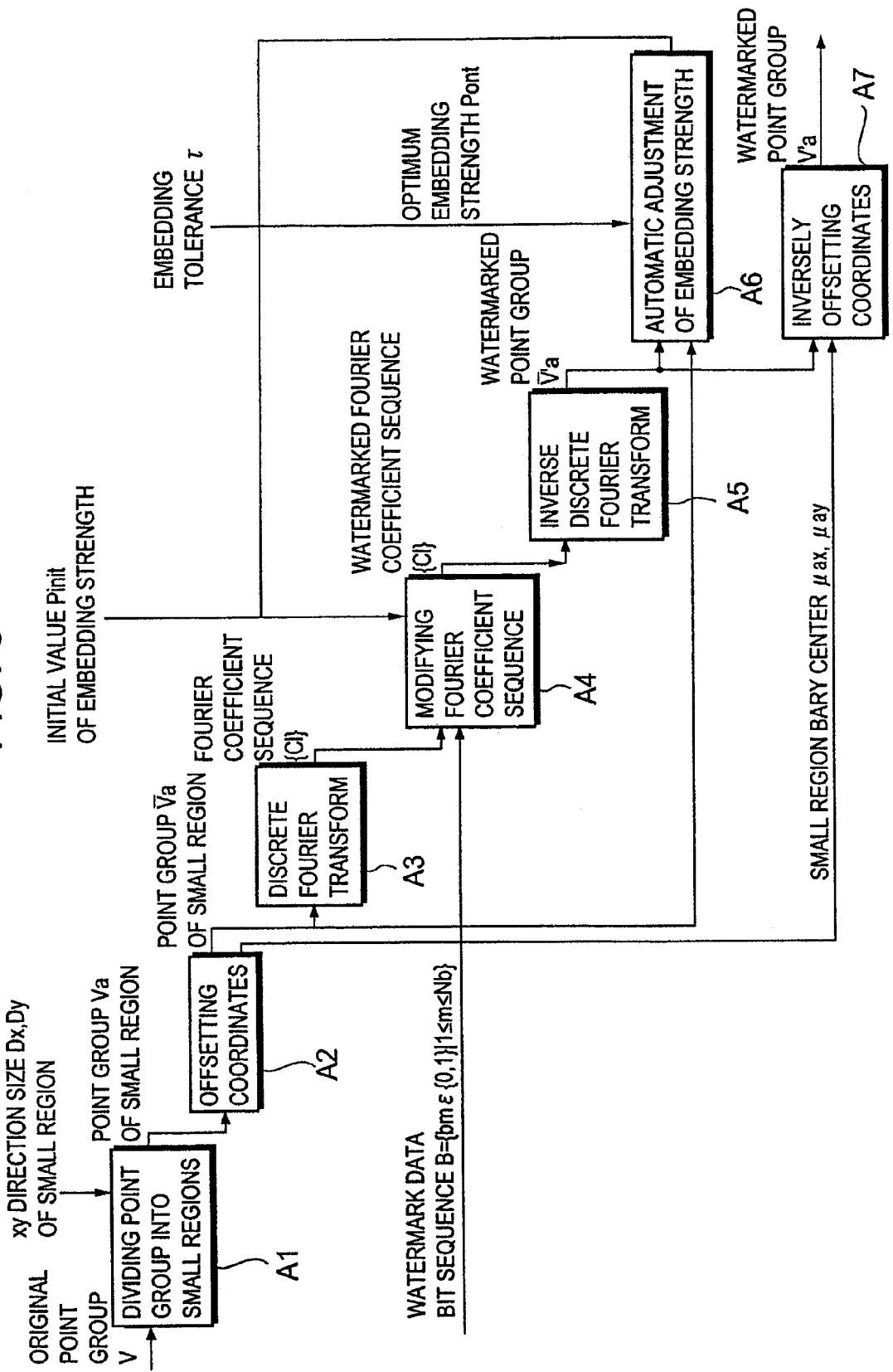
FIG. 3 is a flow chart for describing embedding electronic watermark.

Referring to FIG. 3, description will proceed to an operation of the electronic watermark embedding section.

In the example being illustrated, the electronic watermark embedding section comprises a small region dividing section, a coordinate offset section, a discrete Fourier transform section, a Fourier coefficient sequence modifying section, an inverse discrete Fourier transform section, an embedding strength automatic adjusting section, and an inverse offset section.

On carrying out an electronic watermark data embedding process, the original random point group data (which will be merely called original point group) V is supplied from the above-mentioned geodetic coordinate converting section to the small region dividing section. Furthermore, the small region dividing section is supplied with x and y direction sizes $D_x$ and $D_y$ of each small region, from another inputting device (not shown).

It will be assumed that the original point group V is given by:

$V = \{v_i = (x_i, y_i, z_i) \in R^3 | 0 \leq i \leq N-1\}$ $v_i$: three dimensional coordinates of vertex, N: the number of entire vertexes $D_x$, $D_y$: x and y direction size of divided small region (normal value $D_x$=100[m], $D_y$=100[m])

Figure 4:
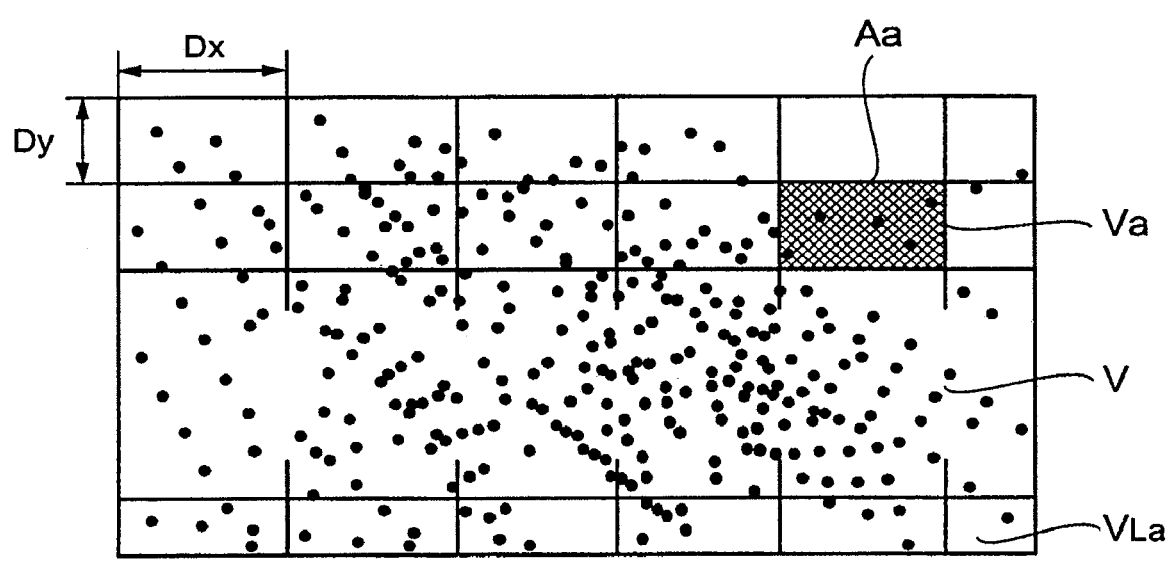
FIG. 4 shows a view for illustrating an example of original random point group data.

At first, the small region dividing section divides the original point group into a plurality of small regions (step A1). As shown in FIG. 4, the original point group V is defined in a rectangular region of x-y plane. The small region dividing section equally divides the rectangular region into a plurality of small regions $A_a$ each of which has the size (dimension) of $D_x$ and $D_y$ (equal division), to produce a plurality of point groups $V_a$ included in the small regions $A_a$, respectively. The point groups $V_a$ are supplied to the coordinate offset section.

$$V = \bigcup_{1 \leq a \leq L_A} V_a \quad (1)$$

$L_A$: the number of entire small regions

Incidentally, a small region having a size less than $D_x$ and $D_y$ may be formed at the ends of the rectangular region such as lower and right sides, when the rectangular region is divided along the x and y directions. $V_{La}$ will designate a point group in the small region having a size less than $D_x$ and $D_y$.

The coordinate offset section carries out an offset of x and y coordinates with respect to the point group of each small region (step A2). For example, the coordinate offset section converts the x and y coordinates of the point group $V_a$ of each small region into an offset point group $\overline{V}_a$ with making a barycenter of point group $V_a$ be an origin point. As a result, the offset point group $\overline{V}_a$ is given by:

$$\overline{V}_a = \{\overline{v}_i | \overline{v}_i = v_i - [\mu_{ax}, \mu_{ay}, 0], v_i \in V_a, 0 \leq i \leq |V_a|-1\} \quad (2)$$

$\mu_{ax}, \mu_{ay}$: x and y coordinates of barycenter of point group $V_a$ $$\mu_{ax} = \frac{1}{|V_a|} \sum_{v_i=(x_i,y_i,z_i) \in V_a} x_i, \quad (3)$$

$$\mu_{ay} = \frac{1}{|V_a|} \sum_{v_i=(x_i,y_i,z_i) \in V_a} y_i$$

In case where the absolute value is great in x and y coordinates of the original point group V, it is possible to reduce an influence of error that is based on floating-point arithmetic using in an embedding process, by the above-mentioned offsetting process.

The offset point group $\overline{V}_a$ is supplied to the discrete Fourier transform section and the embedding strength automatic adjusting section. The small region barycenter $\mu_{ax}$ and $\mu_{ay}$ is supplied to the inverse offset section.

The discrete Fourier transform section carries out discrete Fourier transform (DFT) with respect to the offset point group $\overline{V}_a$ (step A3). In the step A3, the discrete Fourier transform section firstly produces a complex number sequence {ck} given by Equation (4), in accordance with x and y coordinates included in the offset point group $\overline{V}_a$.

$c_k = \overline{x}_k + i \overline{y}_k, (\overline{x}_k, \overline{y}_k, z_k) \in \overline{V}_a, 0 \leq k \leq |V_a|-1$ (4)

i: imaginary unit

Secondly, the discrete Fourier transform section carries out discrete Fourier transform with respect to the complex number sequence {ck} on the basis of Equation (5) to produce Fourier coefficient sequence {$C_l$}.

$$C_l = \sum_{k=0}^{|V_a|-1} c_k (e^{-2\pi i/|V_a|})^{kl}, \quad (5)$$

$l = 0, 1, \ldots, |V_a|-1$

The Fourier coefficient sequence {$C_l$} is supplied to the Fourier coefficient sequence modifying section. The Fourier coefficient sequence modifying section is further supplied with an electronic watermark data bit sequence B and an embedding strength initial value $P_{init}$. The Fourier coefficient sequence modifying section modifies the Fourier coefficient sequence $\{C_l\}$ in accordance with the electronic watermark data bit sequence B and the embedding strength initial value $P_{init}$ (step A4).

The electronic watermark data bit sequence B is given by:
$B = \{b_m \square \{0,1\} | 1 < m < N_b\}$
$N_b$: bit length of watermark data
$p_{init}$: initial value of watermark embedding strength (normal value $p_{init} = 5000$)

Using the electronic watermark data bit sequence $B = \{b_m \square \{0,1\} | 1 \square m \square N_b\}$ and the embedding strength initial value $P_{init}$, the Fourier coefficient sequence modifying section modifies the Fourier coefficient sequence $\{C_1\}$ on the basis of Equation (6), to produce a modified Fourier coefficient sequence $\{C'_i\}$.

$$|C'_l| = \begin{cases} |C_l| + p & (b_l = 0) \\ |C_l| - p & (b_l = 1) \end{cases} \quad (6)$$

Incidentally, a coefficient $C_0$ representative of direct current component is not modified by the watermark data. Therefore, a watermark bit length which is possible to be embedded into the small region $A_a$ becomes $|V_a|-1$. In addition, the value of embedding strength p is determined as $p \leftarrow p_{init}$, on a primary embedding process. The value of embedding strength p is determined as $p \leftarrow p_{opt}$, on a secondary embedding process.

In this event, next rules are used on the basis of a relationship between the watermark bit length $N_b$ and the embedding possible bit length $|V_a|-1$.

i) In case of $N_b < |V_a|-1$:

The watermark bits are repeatedly embedded so that the entire Fourier coefficient $C_1, C_2, \ldots, C_{|Va|-1}$ are modified in accordance with the above-mentioned Equation (6).

i) In case of $N_b > |V_a|1$:

The watermark bits are embedded, using $|V_a|1$ bits from a head. Other bits is not embedded.

The modified Fourier coefficient sequence $\{C'_1\}$, namely, the watermarked Fourier coefficient sequence $\{C'_1\}$ is supplied to the inverse discrete Fourier transform section. The inverse discrete Fourier transform section carries out an inverse discrete Fourier transform (IDFT) with respect to the modified Fourier coefficient sequence $\{C'_1\}$ (step S5). For example, the inverse discrete Fourier transform section carries out the inverse discrete Fourier transform given by Equation (7), with respect to the watermarked Fourier coefficient sequence $\{C'_1\}$. As a result, the inverse discrete Fourier transform section produces a complex number sequence $\{c'_k\}$ which is modified in accordance with the electronic watermark.

$$c_k = \frac{1}{|V_a|} \sum_{k=0}^{|V_a|-1} C'_l (e^{2\pi i/|V_a|})^{kl}, \quad (7)$$

$k = 0, 1, \ldots, |V_a|-1$

The complex number sequence $\{c'_k\}$ is supplied to the embedding strength automatic adjusting section. The embedding strength automatic adjusting section is supplied with the above-mentioned offset point group $\nabla_a$ and an embedding tolerance τ. Taking the embedding tolerance τ into consideration, the embedding strength automatic adjusting section automatically adjusts the embedding strength (step A6).

τ: an embedding tolerance of x and y directions (normal value τ=0.3 (m))

More particularly, the embedding strength automatic adjusting section knows coordinates of watermarked point group data $\nabla_a'$, from the modified complex number sequence $\{c'_k\}$ to produce a maximum error $E_k$ of the x and y directions, between vertexes $\bar{v}_k = (\bar{x}_k, \bar{y}_k, \bar{z}_k)$ $(\epsilon \nabla_a)$ of the no embedded point group $\nabla_a$ and vertexes $\bar{v}'_k = (\bar{x}'_k, \bar{y}'_k, \bar{z}'_k)$ $(\epsilon \nabla_a')$ of embedded point group $\nabla_a'$. The embedding strength automatic adjusting section calculates a vertex number $\hat{k}$ which gives the maximum error. The maximum error is given by:

$$E_{\hat{k}} = \max\left(\max_{k \in [0,|V_a|-1]} (|\bar{x}'_k - \bar{x}_k|), \max_{k \in [0,|V_a|-1]} (|\bar{y}'_k - \bar{y}_k|)\right) \quad (8)$$

It will be assumed that τ is representative of a tolerance (allowable value) of vertex coordinate error in x and y directions that occurs on the basis of embedding. Furthermore, it will be assumed that $p_{opt}$ is representative of an optimum watermark embedding strength which satisfies the tolerance. The proportional relationship holds which is given by Equation (9).

$$\frac{E_{\hat{k}}}{\tau} = \frac{p_{init}}{p_{opt}} \quad (9)$$

From Equation (9), the optimum watermark embedding strength $p_{opt}$, which satisfies the tolerance τ of the embedding error is given by:

$$p_{opt} = \frac{\tau}{E_{\hat{k}}} p_{init} \quad (10)$$

The optimum watermark embedding strength $p_{opt}$ is fed back to the Fourier coefficient sequence modifying section.

The Fourier coefficient sequence modifying section modifies the Fourier coefficient sequence on the basis of the optimum watermark embedding strength $p_{opt}$ to produce a modified result. The inverse discrete Fourier transform section again carries out the inverse discrete Fourier transform in accordance with the modified result. In other words, the above-mentioned steps A4 and A5 are again carried out in accordance with the optimum watermark embedding strength $p_{opt}$ obtained by the manner described above, in order to produce the electronic watermarked offset point group $\nabla_a'$.

The electronic watermarked offset point group $\nabla_a'$ is supplied to the inverse offset section. As described above, the inverse offset section is supplied with the small region barycenter $\mu_{ax}$ and $\mu_{ay}$. The inverse offset section carries out the inverse offsetting with respect to the x and y coordinates to produce watermarked point group $V'_a$ (step A7). For example, the inverse offset section carries out an inverse operation of the above-mentioned Equation (2). In other words, the inverse offset section carries out the inverse offsetting on the basis of Equation (11) to calculate the watermarked point group $V'_a$ in accordance with the watermarked point group $\nabla_a'$.

$$V_a' = \{v_i' = \bar{v}_i' + [\mu_{ax}, \mu_{ay}, 0]', \bar{v}_i' \epsilon \bar{V}_a', 0 \leq i \leq |V_a|-1\} \quad (11)$$

As described above, the electronic watermark embedding section carries out processing with respect to each of the small regions to finally produce the watermarked point group V'. A watermarked point group output section outputs the watermarked point group V' as watermark information embedded three-dimensional spatial coordinate point group to a file.

Figure 5:
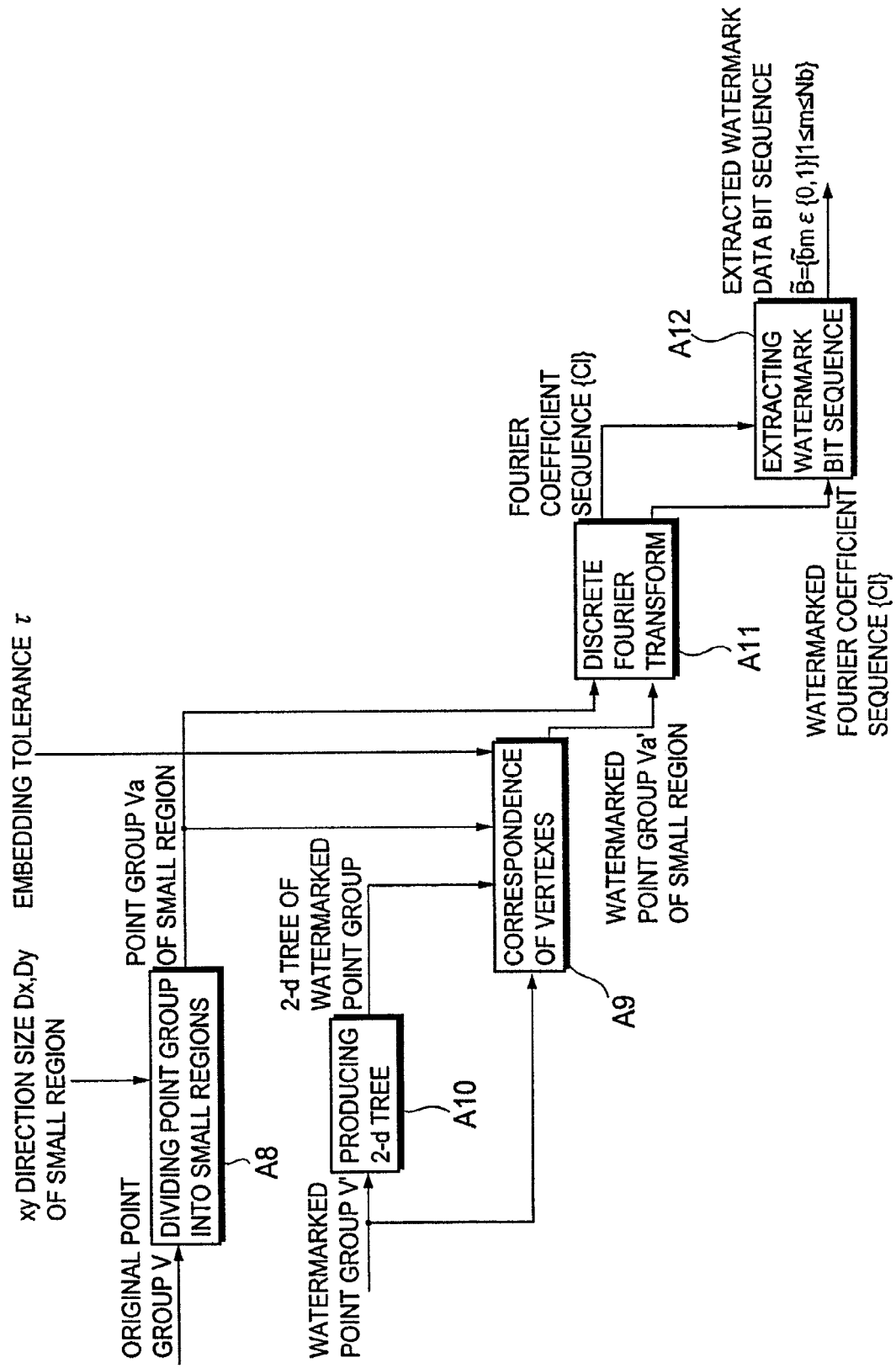
FIG. 5 is a flow chart for describing extraction of watermark data.

Referring to FIG. 5, description will be made about extracting the watermark data from the watermarked point group data V'. In the example being illustrated, the computer comprises a watermark data extracting section which has a point group small region dividing section, a vertex correspondence section, a discrete Fourier transform section, and a watermark bit sequence extracting section.

It will be assumed that the original point group V is given by:

$V = \{v_i = (x_i, y_i, z_i) \in R^3 | 0 \leq i \leq N-1\}$

Furthermore, it will be assumed that the watermarked point group V' is given by:

$V' = \{v_i' = (x_i', y_i', z_i') \in R^3 | 0 \leq i \leq N-1\}$

The above-mentioned $D_x$ and $D_y$ (x and y direction sizes of each small region) and $\tau$ (embedding tolerance of x and y directions) are equal to those of the electronic watermark data embedding process.

At first, the point group small region dividing section is supplied with original point group V and the sizes $D_x$ and $D_y$ of the x and y directions. The point group small region dividing section divides the original point group V into a plurality of small regions (step A8).

Using the sizes $D_x$ and $D_y$ of the x and y directions that are specified in the above-mentioned watermark embedding process, the point group small region dividing section divides the original point group V into the small regions to produce a point group $V_a$ in each of the small regions, in a similar manner described in conjunction with the embedding process.

Incidentally, the watermarked point group V' is stored without division.

The small region point group $V_a$ is supplied to the vertex correspondence section. The vertex correspondence section is further supplied with the above-mentioned embedding tolerance $\tau$ and the watermarked point group V'. The vertex correspondence section brings the vertexes of the small region point group $V_a$ into correspondence with the vertexes of the watermarked point group V' to output a small region watermarked point group $V'_a$ (step A9).

More specifically, the vertex correspondence section makes a search for a vertex which has a shortest distance between a vertex $v_i$ ($\in V_a$) of the small region point group $V_a$ with respect to each small region point group $V_a$, from the watermarked point group V'. The vertex correspondence section adopts the vertex obtained by the above-mentioned search, as a watermarked vertex $v'_i$ ($\in V'$) which corresponds to the vertex $v_i$.

In the above-mentioned correspondence, it takes a searching time with the square of point number to make a search for the watermarked vertex $v'_i$ when making a search for the shortest vertex in a round robin, inasmuch as the point group V' includes a great amount of vertexes. In the example being illustrated, the watermark data extracting section may have a 2-d tree producing section. The 2-d tree producing section may produce a 2-d tree with respect to the watermarked point group V' in a previous process (step A10). Instead of the watermarked point group V', the 2-d tree of the watermarked point group is supplied to the vertex correspondence section.

The vertex correspondence section sets a small inquiry region which is determined by the position of vertex vi ($\in Va$) of original point group and the embedding tolerance $\tau$. The vertex correspondence section makes a search for watermarked vertex group included in the inquiry region, from the 2-d tree at a high speed. In other words, the vertex correspondence section makes a search for watermarked vertex group included in the inquiry region, from the 2-d tree in the round robin. As a result, it is possible to efficiently carry out a correspondence processing between the original point group $v_i$ ($\in V_a$) and the watermarked vertex $v'_i$ ($\in V'$).

After the vertex correspondence section brings original point group $V_a$ included in the small region, into correspondence with the watermarked point group $V'_a$, the discrete Fourier transform section carries out the DFT with respect to the original point group $V_a$ and the watermarked point group $V'_a$ (step A11). For example, the discrete Fourier transform section carries out the DFT given by Equations (4) and (5) with respect to the original point group and the watermarked point group corresponding to the original point group, in a similar manner described in conjunction with the embedding process, in order to produce the Fourier coefficient sequence $\{C_l\}$ and the watermarked Fourier coefficient sequence $\{C'_l\}$.

The watermark bit sequence extracting section carries out an extraction of electronic watermark data in accordance with the Fourier coefficient sequence $\{C_l\}$ and the watermarked Fourier coefficient sequence $\{C'_l\}$ (step A12). More particularly, the watermark bit sequence extracting section compares the Fourier coefficient sequence $\{C_l\}$ and the watermarked Fourier coefficient sequence $\{C'_l\}$ each of which is obtained in the manner described above, in order to extract a bit sequence $\tilde{B} = \{\tilde{b}_m \in \{0,1\} | 1 \leq m \leq N_b\}$ of the embedded watermark data on the basis of Equation (12).

$$\tilde{b}_l = \begin{cases} 0 & (|C'_l| - |C_l| \geq 0) \\ 1 & (|C'_l| - |C_l| < 0) \end{cases} \qquad (12)$$

As described above, the extracted watermark bit sequence is compared with the original watermark bit sequence which is managed, after the watermark bit sequence extracting section extracts a bit sequence $\tilde{B} = \{\tilde{b}_m \in \{0,1\} | 1 \leq m \leq N_b\}$ of the embedded watermark data on the basis of Equation (12). On the basis of the comparison result, judgment is carries out with respect to whether or not the watermarked point group data are produced from the original point group data.

APPLICATION POSSIBILITY ON THE INDUSTRY

It is possible to prevent the unauthorized use of the original random point group data in the present invention inasmuch as the electronic watermark data embedded into the original random point group data, as described above. Furthermore, it is possible to judge whether or not the watermarked point group data are produced from the original random point group data in accordance with the comparison result, inasmuch as the electronic watermark data are extracted from the watermarked point group data to be compared with the original electronic watermark data which are managed, as described above. In other words, it is possible to judge an identity of the original random point group data.

The invention claimed is:

1. An electronic information embedding method for use in embedding electronic information as electronic watermark data in original random point group data comprising of a plurality of vertexes and are irregular data aggregate specified in a vector type, comprising the steps of:
    a first step of carrying out a discrete Fourier transform with respect to said original random point group data given two peak coordinates out of the plurality of vertexes without a particular orderly array, wherein said two peak coordinates in which one of said two peak coordinates is a real part and another is an imaginary part is one dimensionally ordered, to produce a Fourier coefficient sequence;
a second step of modifying said Fourier coefficient sequence in accordance with said electronic watermark data to produce a watermarked Fourier coefficient sequence; and
a third step of carrying out an inverse discrete Fourier transform with respect to said watermarked Fourier coefficient sequence to produce a watermarked point group data on the basis of said inverse discrete Fourier transform.

2. An electronic information embedding method as claimed in claim 1, wherein said plurality of vertexes are indicated by the plurality of vertexes which are obtained on the basis of a three dimensional measurement.

3. An electronic information embedding method as claimed in claim 2, wherein the one dimension complex Fourier transform is carried out in respect to a Fourier coefficient sequence arranged as $C_k = X_k + iy_k$, k is a nonnegative integer and i is an imaginary unit, wherein a real part of a complex Fourier coefficient Ck is Xk and an imaginary part of the complex Fourier coefficient Ck is $y_k$ for carrying of when the complex Fourier transform is carried out.

4. An electronic information embedding method as claimed in claim 1, wherein said first step comprises:
a fourth step of producing a point group with respect to each of small regions into which an x-y plane region defining said original random point group data is divided in a predetermined number;
a fifth step of offsetting x and y coordinate values of each point group
with making a barycenter of said point group be an origin point, to convert each point group into an offset point group; and
a sixth step of carrying out the discrete Fourier transform with respect to each of said offset point group to produce the Fourier coefficient sequence.

5. An electronic information embedding method as claimed in claim 4, wherein said third step comprises:
a seventh step of carrying out the inverse discrete Fourier transform with respect to said watermarked Fourier coefficient sequence to produce a watermarked complex sequence;
an eighth step of producing an optimum watermark embedding strength which satisfies a tolerance of coordinate error based on watermarking, with respect to said watermarked complex sequence;
a ninth step of again modifying the Fourier coefficient sequence in accordance with said optimum watermark embedding strength to produce a watermarked Fourier coefficient sequence; and
a tenth step of inversely offsetting said watermarked Fourier coefficient sequence to produce said watermarked point group data.

6. An electronic information extracting method of extracting said electronic watermark data from said watermarked point group data, which is obtained by the electronic information embedding method, as claimed in claim 1, comprising:
an eleventh step of carrying out a discrete Fourier transform with respect to said original random point group data and said watermarked point group data with bringing said original random point group data into correspondence with said watermarked point group data, to produce first and second Fourier coefficient sequences; and
a twelfth step of comparing said first Fourier coefficient sequence with said second Fourier coefficient sequence to extract said electronic watermark data from said first and second Fourier coefficient sequences.

7. An electronic information extracting method as claimed in claim 6, wherein said eleventh step comprises:
a thirteenth step of producing a small region point group with respect to each of small regions into which an x-y plane region defining said original random point group data is divided in a predetermined number; and
a fourteenth step of making a search for a shortest distance vertex which has the shortest distance between a vertex of the small region point group with respect to each of said small region point groups, from said watermarked point group data, to bring said original random point group data into correspondence with said watermarked point group data.

8. An electronic information extracting method as claimed in claim 7, wherein said fourteenth step comprises:
a fifteenth step of producing a 2-d tree with respect to said watermarked point group data; and
a sixteenth step of setting an inquiry region which is defined by vertex position of each small region point group and an embedding tolerance, to make a search for said watermarked point group data included in said inquiry region, from said 2-d tree and to bring said original random point group data into correspondence with said watermarked point group data.

9. An electronic information embedding apparatus for use in embedding electronic information as electronic watermark data in original random point group data comprising of a plurality of vertexes which are obtained on the basis of a three dimensional measurement, and are irregular data aggregate specified in a vector type, comprising:
a processor used to embed electronic watermark data;
discrete Fourier transform means for carrying out a discrete Fourier transform using the processor with respect to said original random point group data given two peak coordinates out of the plurality of vertexes without a particular orderly array, wherein said two peak coordinates in which one of said two peak coordinates is a real part and another is an imaginary part is one dimensionally ordered, to produce a Fourier coefficient sequence;
modifying means for modifying said Fourier coefficient sequence in accordance with said electronic watermark data to produce a watermarked Fourier coefficient sequence; and
watermarked point group data producing means for carrying out an inverse discrete Fourier transform with respect to said watermarked Fourier coefficient sequence to produce a watermarked point group data on the basis of said inverse discrete Fourier transform.

10. An electronic information embedding apparatus as claimed in claim 9, wherein said plurality of vertexes are indicated by the plurality of vertexes which are obtained on the basis of a three dimensional measurement.

11. An electronic information embedding apparatus as claimed in claim 10, wherein the one dimension complex Fourier transform is carried out in respect to a Fourier coefficient sequence arranged as $C_k = x_k + iy_k$, k is a nonnegative integer and i is an imaginary unit, wherein a real part of a complex Fourier coefficient $C_k$ is $X_k$ and an imaginary part of the complex Fourier coefficient Ck is $Y_k$ for carrying of when the complex Fourier transform is carried out.

12. An electronic information embedding apparatus as claimed in claim 9, wherein said discrete Fourier transform means comprises:
dividing means for producing a point group with respect to each of small regions into which an x-y plane region defining said original random point group data is divided in a predetermined number;
offset means for offsetting x and y coordinate values of each point group with making a barycenter of said point group be an origin point, to convert each point group into an offset point group; and
Fourier coefficient producing means for carrying out the discrete Fourier transform with respect to each of said offset point group to produce the Fourier coefficient sequence.

13. An electronic information embedding apparatus as claimed in claim 12, wherein said watermarked point group data producing means comprises:
complex number sequence producing means for carrying out the inverse discrete Fourier transform with respect to said watermarked Fourier coefficient sequence to produce a watermarked complex number sequence;
watermark embedding strength producing means for producing an optimum watermark embedding strength which satisfies a tolerance of coordinate error due to watermarking, with respect to said watermarked complex number sequence;
additional modifying means for again modifying the Fourier coefficient sequence in accordance with said optimum watermark embedding strength to produce a watermarked Fourier coefficient sequence; and
inverse offset means for inversely offsetting said watermarked Fourier coefficient sequence to produce said watermarked point group data.

14. An electronic information extracting apparatus for extracting said electronic watermark data from said watermarked point group data, which is obtained by the electronic information embedding apparatus, as claimed in claim 9, comprising:
Fourier coefficient producing means for carrying out a discrete Fourier transform with respect to said original random point group data and said watermarked point group data by bringing said original random point group data into correspondence with said watermarked point group data, to produce first and second Fourier coefficient sequences; and
extracting means for comparing said first Fourier coefficient sequence with said second Fourier coefficient sequence to extract said electronic watermark data from said first and second Fourier coefficient sequences.

15. An electronic intonation extracting apparatus as claimed in claim 14, wherein said Fourier coefficient producing means comprises:
dividing means for producing a small region point group with respect to each of small regions into which an x-y plane region defining said original random point group data is divided in a predetermined number; and
correspondence means for making a search for a shortest distance vertex which has a shortest distance between a vertex of the small region point group with respect to each of said small region point groups, from said watermarked point group data, to bring said original random point group data into correspondence with said watermarked point group data.

16. An electronic information extracting apparatus as claimed in claim 15, wherein said correspondence means comprises:
2-d tree producing means for producing a 2-d tree with respect to said watermarked point group data; and
vertex correspondence means for setting an inquiry region which is defined by vertex position of each small region point group and an embedding tolerance, to make a search for said watermarked point group data included in said inquiry region, from said 2-d tree and to bring said original random point group data into correspondence with said watermarked point group data.

17. An electronic information embedding program stored on a non-transitory computer-readable medium and used in a computer on embedding electronic information as electronic watermark data in original random point group data comprising of a plurality of vertexes and are irregular data arrogated specified in a vector type, comprising:
a first procedure of carrying out a discrete Fourier transform with respect to said original random point group data given two peak coordinates out of the plurality of vertexes without a particular orderly array, wherein said two peak coordinates in which one of said two peak coordinates is a real part and another is an imaginary part is one dimensionally ordered, to produce a Fourier coefficient sequence;
a second procedure of modifying said Fourier coefficient sequence in accordance with said electronic watermark data to produce a watermarked Fourier coefficient sequence; and
a third procedure of carrying out an inverse discrete Fourier transform with respect to said watermarked Fourier coefficient sequence to produce a watermarked point group data on the basis of said inverse discrete Fourier transform.

18. An electronic information embedding program as claimed in claim 17, wherein said plurality of vertexes are indicated by the plurality of vertexes which are obtained on the basis of a three dimensional measurement.

19. An electronic information embedding program as claimed in claim 18, wherein the one dimension complex Fourier transform is carried out in respect to a Fourier coefficient sequence arranged as $C_k=X_k+iy_k$, k is a nonnegative integer and i is an imaginary unit, wherein a real part of a complex Fourier coefficient $C_k$ is $X_k$ and an imaginary part of the complex Fourier coefficient $C_k$ is $y_k$ for carrying of when the complex Fourier transform is carried out.

20. An electronic information embedding program as claimed in claim 17, wherein said first procedure comprises:
a fourth procedure of producing a point group with respect to each of small regions into which an x-y plane region defining said original random point group data is divided in a predetermined number;
a fifth procedure of offsetting x and y coordinate values of each point group with making a barycenter of said point group be an origin point, to convert each point group into an offset point group; and
a sixth procedure of carrying out the discrete Fourier transform with respect to each of said offset point group to produce the Fourier coefficient sequence.

21. An electronic information embedding program as claimed in claim 20, wherein said third procedure comprises:
a seventh procedure of carrying out the inverse discrete Fourier transform with respect to said watermarked Fourier coefficient sequence to produce a watermarked complex number sequence;
an eighth procedure of producing an optimum watermark embedding strength which satisfies a tolerance of coordinate error based on watermarking, with respect to said watermarked complex number sequence;

a ninth procedure of again modifying the Fourier coefficient sequence in accordance with said optimum watermark embedding strength to produce a watermarked Fourier coefficient sequence; and a tenth procedure of inversely offsetting said watermarked Fourier coefficient sequence to produce said watermarked point group data.

22. An electronic information extracting program of operating on a computer and of extracting said electronic watermark data from said watermarked point group data which is obtained claim 17, comprising:

an eleventh procedure of carrying out a discrete Fourier transform with respect to said original random point group data and said watermarked point group data with bringing said original random point group data into correspondence with said watermarked point group data, to produce first and second Fourier coefficient sequences; and a twelfth procedure of comparing said first Fourier coefficient sequence with said second Fourier coefficient sequence to extract said electronic watermark data from said first and second Fourier coefficient sequences.

23. An electronic information extracting program as claimed in claim 22, wherein said eleventh procedure comprises:

a thirteenth procedure of producing a small region point group with respect to each of small regions into which an x-y plane region defining said original random point group data is divided in a predetermined number; and a fourteenth procedure of making a search for a shortest distance vertex which has a shortest distance between a vertex of the small region point group with respect to each of said small region point groups, from said watermarked point group data, to bring said original random point group data into correspondence with said watermarked point group data.

24. An electronic information extracting program as claimed in claim 23, wherein said fourteenth procedure comprises:

a fifteenth procedure of producing a 2-d tree with respect to said watermarked point group data; and a sixteenth procedure of setting an inquiry region which is defined by vertex position of each small region point group and an embedding tolerance, to make a search for said watermarked point group data included in said inquiry region, from said 2-d tree and to bring said original random point group data into correspondence with said watermarked point group data.

\* \* \* \* \*